Jan. 11, 1949.  E. L. BUSH  2,459,060
RAT GUARD
Filed Nov. 20, 1945
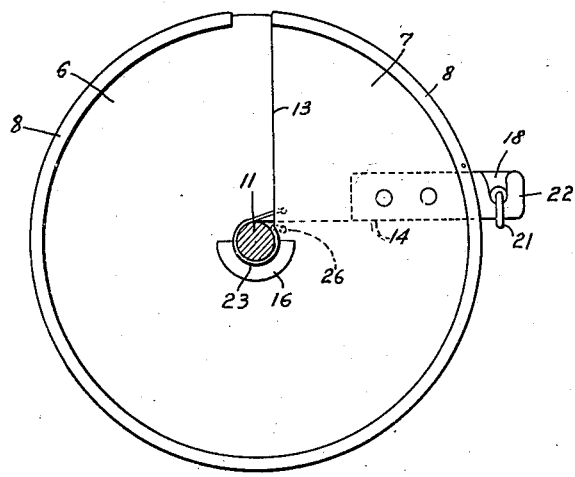
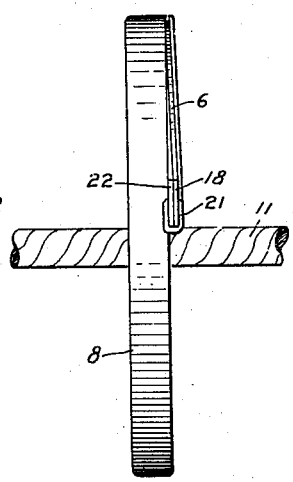
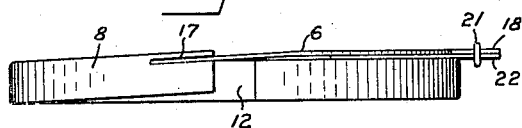
INVENTOR.
EAN LEE BUSH
BY George B. White
HIS ATTORNEY Patented Jan. 11, 1949

2,459,060

UNITED STATES PATENT OFFICE 2,459,060

RAT GUARD

Ean Lee Bush, San Francisco, Calif.

Application November 20, 1945, Serial No. 629,751

11 Claims. (Cl. 114—221)

My invention pertains to rat guards for cables or hawsers.

The primary object of the invention is to provide a rat guard which can be quickly and efficiently clamped on a hawser or the like, and which completely prevents the passage of rats or the like along the hawser, cable or rope between a ship and the dock at which the ship is moored.

The features of my invention include the simplicity and flatness of the guard so that it can be easily stored when out of use; the ready interlocking elements which are relatively adjustable yet completely obstruct all passage along the hawser, rope, cable or the like, and which are firmly clamped into position yet are easily turnable into open position for the releasing of the guard from the hawser or the like.

Another object of this invention is to provide a rat guard which is highly useful and simple in construction. Convenience of arrangement, lightness and comparative inexpense of manufacture are further objects which have been borne in mind in the production and development of the invention.

In manufacturing the device, while the various elements thereof may be constructed in any suitable manner and of any suitable material, yet it is preferable to form the same from sheet metal stampings on account of the cheapness, lightness and strength of the latter; but irrespective of these details in manufacturing, the essential features of the invention are always preserved.

The essential features of the invention involved in the carrying out of the objects indicated are susceptible to modification, but a preferred embodiment of the invention is shown in the accompanying drawings, in which:

Fig. 1 is a side elevation view of the rat guard constructed in accordance with my invention;

Fig. 2 is a side edge view of the rat guard mounted on the hawser;

Fig. 3 is a bottom edge view of the rat guard;

Fig. 4 is a sectional view of the rat guard, the section being taken on the vertical center line of Fig. 1 and Fig. 5 is a side elevation view showing the rat guard in open position.

The rat guard of my invention includes a pair of superimposed discs or plates 6 and 7. The outer disc 7 has a peripherial flange 8 which extends over the edges of the other disc 6 so as to guide the inner disc 6 in its rotation about the axis of said discs. Each disc has a portion thereof radially cut away. Each cut away portion is substantially the width of a central hole 9 which hole 9 fits over the average hawser 11 used for mooring ships and the like. From this hole 9 extends the radial slit 12, in each of said discs 6 or 7, so that when the slits 12 are superimposed as shown in Fig. 5 then the unit consisting of the two discs 6 and 7 can be slid over the hawser 11 so that it will be in engagement with the hawser at the center hole 9. The edge 13 of the slit 12 on the outer disc 7 is off set toward the inner disc 6 so that when the inner disc is rotated, then the outer portion of the slit edge 14 of the inner disc 6 crosses over to the backside of the outer disc 7 for firmer interlocking. The rotation of the inner disc 6 relatively to the outer disc 7 is accomplished around a journalled flange 16 on the outer disc 7 formed around the lower half of the hole 9. The flange 16 overlaps the adjacent edge of the hole 9 in the inner disc 6, so that the inner disc 6 is held centrally between the journal flange 16 and the outer flange 8 and is relatively rotatable to various opening and locking positions.

It is to be noted that in the peripheral flange 8 of the disc 7 and adjacent the edge 14 of this slit 12 is a circumferential retaining slot 17, as shown particularly in Fig. 3. An ear 18 extended from the disc 6 is engageable with the slot 17 for holding the units together when in released position. This ear 18 extends in continuation of one edge of the slit 12 of the disc 6 as particularly shown in Fig. 5. This ear 18 is provided with a hole 19 therethrough into which can be secured a pulling cord or line 21 for the manipulation or turning of the inner disc 6. A hook 22 is extended from the back face of the other disc 7. This hook 22 extends substantially at right angles to the position of the radial slit 12 in the disc 7. When the discs 6 and 7 are rotated relatively to each other so as to offset the respective slits 12 in the manner shown in Fig. 1, then the ear 18 is in registry with the hook 22 and the cord 21 can be used to tie the two together and thereby fasten the discs 6 and 7 in guarding position. As shown in Fig. 1, the inner ends or holes 9 of the slits 12 surround the cable 11 when offset at right angles, and are tightly clamped thereover. The respective discs mutually cover the respective slits 12 outside of the area of the holes 9 and thereby guard the passage along the cable 11.

A flexible tying line 23 is arranged in the central hole 9 of the slits 12. An end of the line 23 is attached at 24 to the outer face of the disc 6 adjacent to the edge 14 of the slit 12. The other end of the line 23 is secured at 26 at the underside of the disc 7 adjacent the edge 13 of the other slit 12. When the unit is placed over a cable or line 11 and when discs 6 and 7 are rotated relatively so as to offset the slits 12 into mutually covered positions as shown in Fig. 1, then the flexible line 23 is tightly wrapped or wound around the line 11 and provides additional means for securely holding the guard in place on the line 11.

The invention herein described obviates the necessity for heavy castings and separate parts to be assembled on lines as well as the breakage of such guards that were used in the past. In my invention the two discs are held together rotatably around the same center so that the radial slits are aligned in the open position to permit the easy slipping of the guard over the cable, and thereafter by rotating relatively the discs, the slits 12 outside of the hole 9 are mutually covered, and the space around the cable 11 is positively obstructed. The guard is easily placed upon a line or hawser, and it is easily locked in place or released or removed without any complicated mechanisms or adjustments.

I claim:

1. A rat guard of the character described for mooring lines and the like, comprising a pair of superimposed discs rotatable relatively to one another, said discs having substantially radial aligned slits extending from the axis of relative rotation to the peripheries of the respective discs, the central end of each slit being adapted to fit over a portion of the periphery of said line, and said central ends of said slits complementing one another to surround said line when said discs are turned to shift said slits from said aligned position to an angularly offset position, and releasable means to hold said discs in said offset position.

2. A rat guard for mooring lines and the like, comprising a pair of superimposed discs held together in face to face relation and being rotatable relatively to one another, said discs having aligned slits extending substantially from the center of rotation to the periphery of said discs and being adapted to be inserted over said line and to surround said line at said centers when said discs are turned to offset one slit with respect to the other slit for mutually covering the respective slits outside the central area occupied by said line.

3. A rat guard comprising a pair of superimposed discs held together rotatably with respect to one another, each disc having a radial slit therein which slits when aligned are slidable over a line and when offset surround and grip said line.

4. A rat guard comprising a pair of superimposed discs held together rotatably with respect to one another, each disc having a radial slit therein which slits when aligned are slidable over a line and when offset surround and grip said line, and guide means to cross over the respective radial edges of said slits to opposite faces of said discs when said discs are rotated to offset said slits.

5. A rat guard comprising a pair of superimposed discs held together rotatably with respect to one another, each disc having a radial slit therein which slits when aligned are slidable over a line and when offset surround and grip said line, and guide means to cross over the respective radial edges of said slits to opposite faces of said discs when said discs are rotated to offset said slits, and releasable means to fasten said discs in said offsetting relation.

6. A rat guard comprising a pair of superimposed discs held together rotatably with respect to one another, each disc having a radial slit therein which slits when aligned are slidable over a line and when offset surround and grip said line, and a flexible tying member secured at one end to one of said discs and at its other end to the other disc and extending across the central end of said slits for tightly wrapping around the line in said slits when said discs are rotated to offset said slits.

7. A rat guard of the character described for mooring lines and the like, comprising a pair of superimposed discs, means to rotatably connect said discs together at about the centers thereof, said discs having aligned radial slits extended from the center to the outer periphery and being slidable over said line, the central ends of said slits fitting over said line, and means to guide said discs during relative rotation to cross over the edges of the respective slits to opposite faces of the respective discs.

8. A rat guard of the character described for mooring lines and the like, comprising a pair of superimposed discs, means to rotatably connect said discs together at about the centers thereof, said discs having aligned radial slits extended from the center to the outer periphery and being slidable over said line, the central ends of said slits fitting over said line, and means to guide said discs during relative rotation to cross over the edges of the respective slits to opposite faces of the respective discs, said guiding means including a peripheral flange on one disc surrounding the other disc, and engagement means on the edge of the slit of said other disc slidable under the first disc when said discs are relatively rotated.

9. A rat guard of the character described for mooring lines and the like, comprising a pair of superimposed discs, means to rotatably connect said discs together at about the centers thereof, said discs having aligned radial slits extended from the center to the outer periphery and being slidable over said line, the central ends of said slits fitting over said line, and means to guide said discs during relative rotation to cross over the edges of the respective slits to opposite faces of the respective discs, an extension from one of said discs at said slit, an engagement extension from the other disc at about right angles to the slit in said other disc, and means for releasably fastening said extensions together when said discs are in guard position.

10. A rat guard of the character described for mooring lines and the like, comprising a pair of superimposed discs, means to rotatably connect said discs together at about the centers thereof, said discs having aligned radial slits extended from the center to the outer periphery and being slidable over said line, the central ends of said slits fitting over said line, and means to guide said discs during relative rotation to cross over the edges of the respective slits to opposite faces of the respective discs, a flexible fastening line having one end thereof connected to the side of one disc adjacent the slit and having its other end connected to the opposite side of the other disc adjacent to the other side of the disc in said second disc.

11. A rat guard comprising a disc having a radial slit therein slidable over a line, a second disc pivoted to first disc and having a radial edge slidable over said line when aligned with an edge of said slit of said first disc and being adapted to complement the central end of said slit for gripping said line when circularly offset with respect to the same.

EAN LEE BUSH.

REFERENCES CITED

The following references are of record in the file of this patent:

FOREIGN PATENTS

| Number | Country | Date |
|--------|---------|------|
| 441,360 | France | Aug. 5, 1912 |